Patented Feb. 8, 1944

2,341,453

UNITED STATES PATENT OFFICE 2,341,453

LUBRICATING OIL COMPOSITION, CONDENSATION PRODUCT TO BE ADMIXED THEREWITH, AND ITS METHOD OF PREPARATION

Eugene Lieber, Staten Island, N. Y., and Aloysius F. Cashman, Bayonne, N. J., assignors to Standard Oil Development Company, a corporation of Delaware No Drawing. Application December 27, 1940, Serial No. 371,995

17 Claims. (Cl. 252—45)

This invention relates to a novel type of chemical condensation product and to methods of preparing such products and using them for various purposes, more particularly as pour depressors in waxy lubricating oils.

Broadly, the invention comprises the production of a new type of chemical condensation product having wax-modifying properties, by reacting together a halogenated aliphatic organic compound with an inorganic sulfur-containing material. This condensation does not require the use of any catalyst or condensation agent, but takes place upon barely heating the two reactants together, preferably by refluxing them with a suitable inert solvent.

The halogenated aliphatic organic compound is preferably a halogenated derivative of an organic compound containing aliphatic chains and containing more than five aliphatic carbon atoms. The substances of which the halogenated derivatives are to be used are preferably solid hydrocarbons containing aliphatic chains such as the solid hydrocarbon waxes of which paraffin wax and petrolatum are the most common representatives, and of these two petrolatum is preferred. However, although not as good, liquid hydrocarbons may be used such as kerosene, gas oils, and lubricating oils, especially those which are rich in aliphatic constituents. Also, although the hydrocarbons are preferred other aliphatic organic compounds may be used such as higher alcohols, aldehydes, ketones, acid esters, etc., containing more than five aliphatic carbon atoms, and preferably more than ten aliphatic carbon atoms. Some specific examples of such compounds include phenyl alcohol, octadecyl alcohol, lauric aldehyde, diisobutyl ketone, and stearic acid, palmitic acid, heptyl acetate, ethyl stearate, and the isopropyl esters of wax oxidation acids.

The reactive halogen group to be inserted is preferably chlorine because it is most efficient and economical; and ordinarily about 5 to 50% of chlorine should be introduced, preferably about 10 to 30% by weight.

The inorganic sulfur-containing material should be preferably an inorganic polysulfide, and/or its mixtures with elemental sulfur. If an inorganic polysulfide is used, it should preferably be a polysulfide of a radical selected from the group consisting of hydrogen, alkali metals, ammonium, and alkaline earth metals. Specific examples of such compounds include sodium polysulfides, e. g., sodium pentasulfide, hydrogen polysulfide, ammonium polysulfide, calcium polysulfide, etc., although of all of these the sodium polysulfides are preferred because they are both efficient and economical. The corresponding selenium and tellurium materials may be used, if desired.

In carrying out the reactions the proportions to be used should be about 0.5–5.0 parts by weight, preferably 0.7 to 2.0 parts by weight of the inorganic polysulfide to one part by weight of halogenated aliphatic organic compound. The temperature should be between the approximate limits of room temperature and 300° F., and preferably about 150°–250° F. The time of reaction should be about 1 to 20 hours, preferably about 5 to 10 hours, varying inversely with the temperature. The temperature and time should be adjusted to obtain a condensation product having the desired high molecular weight and yet soluble in mineral oils and having the desired pour-depressing properties. As mentioned before, the reaction is preferably carried out in the presence of a diluent or solvent which should be a non-aqueous liquid such as absolute alcohol or isopropyl alcohol, and the proportion thereof should be about 1 to 10 volumes of solvent to one volume of mixed reactants. As other solvents may be mentioned water, ketones, e. g., acetone, methyl ethyl ketones, and aromatic hydrocarbons, e. g., benzene, toluene, etc.

If the halogenated aliphatic organic compound is to be actually made instead of obtained in a form ready to use, a suitable procedure would be to chlorinate a de-oiled petrolatum (e. g., of 143° F. melting point) by passing chlorine gas through the molten petrolatum maintained at about 200° F. until the material had absorbed about 12–13% of chlorine by weight. A similar procedure can be used to chlorinate a crystalline paraffin wax (e. g., of 121° F. melting point). The chlorination of either of these materials can be carried out until any desired amount of chlorine has been combined.

The following procedure can be used to carry out the condensation of the halogenated aliphatic organic compound with the inorganic sulfur-containing material.

The desired amount of reactants such as chlorinated petrolatum and sodium pentasulfide (finely powdered) may be dissolved in a suitable amount of isopropyl alcohol, contained in an agitator equipped with a mechanical stirrer, a return condenser, and a thermometer. The stirrer is started and the agitator is heated to bring the reactants to a vigorous refluxing and maintained in that condition or the desired length of time.

After the completion of the reaction a suitable amount of water (such as about two liters for the amount of materials used in the experiments to be described later) is then added to the reaction mixture which is then poured into a large separatory funnel or other suitable equipment and extracted with a suitable amount of paraffin or similar hydrocarbon solvent (1½ liters being sufficient for the amount of materials used in the following experiment). After complete settling, the kerosene extract, containing the desired condensation products, is distilled with fire and steam to about 600° F. in order to remove solvent and low-boiling products. The bottoms residue is the desired high molecular weight, oil-soluble condensation product. It is usually dark in color and varies from a viscous oil to a wax-like solid in consistency. It should have a molecular weight above about 1,000, preferably above 2,000. Although the mechanism of the reactions involved in the present invention is not completely understood with certainty, it is believed that the high molecular weight condensation product is an aliphatic hydrocarbon polysulfide and it is believed to be a linear type condensation product having alternate groupings of aliphatic hydrocarbon radicals and sulfur atoms.

The product of this invention has the property of modifying the crystal structure of waxes such as paraffin wax present when added to compositions containing the same. For instance, when about .05–10.0%, preferably—.2–5.0%, of this wax modifier is added to a waxy lubricating oil such as a Pennsylvania type lubricating oil having a relatively high pour point, the resultant blend will have a substantially lower pour point; in other words, this wax modifier is an effective pour depressor for waxy oil. A small amount of this wax modifier is also useful as a dewaxing aid for removing wax from mineral lubricating oils of undesirably high wax content. In similarly small amounts, this wax modifier may also be incorporated into paraffin wax or compositions containing the same to be used for various purposes such as for coating or impregnating paper, etc., or for making various molded products.

For the sake of illustration, but without limiting the invention to the particular materials used, the following experimental data are given:

Example 1

A series of five tests was made, using the general procedure outlined above. In each case 200 grams of the halogenated aliphatic compound and the desired amount of sodium pentasulfide were dissolved in 1500 cc. of 98% isopropyl alcohol in a vessel equipped with a mechanical stirrer, a return condenser, a heater and thermometer, as mentioned above. In each case the reactants were brought to a state of vigorous refluxing and maintained in that condition for the number of hours shown in the table. The high molecular weight condensation product was recovered as described above, the amount of yield obtained being shown in the table. The pour-depressing potency and the physical color and consistency of the product are also shown in the table.

Table

| Test No. | Halogenated aliphatic compound (200 gm.) | Sodium pentasulfide, gm. | Time, hrs. | Yield, gm. | Product °F. pour point [1] per cent addition | | | |
|---|---|---|---|---|---|---|---|---|
| | | | | | 1 | 2 | 5 | |
| 1 | 12.4% Cl'd petrolatum | 200 | 7 | 173 | −5 | −15 | | Dark waxy oil-soluble solid. |
| 2 | 12.5% Cl'd petrolatum | 150 | 7 | 164 | | −25 | | Do. |
| 3 | 12.0% Cl. Paraf. wax (121° F. M.P.) | 150 | 7½ | 182 | | 0 | | Do. |
| 4 | ......do...... | 200 | 6 | 110 | | −10 | | Do. |
| 5 | 30% Cl. Paraf. wax (121° F. M.P.) | 200 | 5½ | 50 | | −10 | −20 | Dark green visc. oil. |

[1] Blend in oil having original pour point of +30° F.

The pour-point data in the above table show that when 2% of the high molecular weight condensation product of this invention, as made in each of the above five tests, was added to a waxy lubricating oil base stock having a pour point of +30° F., the resulting blend had pour points ranging from 0° F. to as low as even −25° F. Thus according to the present invention a novel type of pour depressor has been discovered, and it is made by a process not hitherto known to be capable of producing pour depressors.

It is not intended that this invention be limited to any of the specific examples which were given merely for the sake of illustration nor to any theory as to the mechanism of the operation of the invention but only by the appended claims in which is it intended to claim all novelty inherent in the invention as broadly as the prior art permits.

We claim:

1. A high molecular weight condensation product of a halogenated aliphatic organic compound containing at least 5 aliphatic carbon atoms with an inorganic sulfur-containing material selected from the class consisting of inorganic polysulfides and mixtures thereof with elemental sulfur, said product having a molecular weight above about 1,000.

2. A high molecular weight condensation product of a chlorinated aliphatic organic compound containing at least 5 aliphatic carbon atoms with an inorganic polysulfide, said product having a molecular weight above about 1,000 and being substantially non-volatile at temperatures up to about 600° F.

3. Product according to claim 2 in which the chlorinated compound is a chlorinated hydrocarbon.

4. Product according to claim 2 in which the chlorinated compound is a chlorinated solid hydrocarbon containing an aliphatic chain.

5. A high molecular weight condensation product of a chlorinated aliphatic hydrocarbon wax with an inorganic polysulfide of an inorganic cation having a valence of not more than 2, said product having a molecular weight above about 1,000 and being substantially non-volatile at temperatures up to about 600° F.

6. Product according to claim 5 in which the chlorinated material is chlorinated petrolatum.

7. An aliphatic hydrocarbon polysulfide nonvolatile at temperatures up to about 600° F., having a molecular weight above about 1,000 and having pour-depressing properties, in which the various aliphatic radicals contain more than 5 carbon atoms.

8. An aliphatic hydrocarbon polysulfide nonvolatile at temperatures up to about 600° F., having a molecular weight above about 1,000, and having pour-depressing properties, in which the aliphatic radicals contain more than 5 carbon atoms, said hydrocarbon polysulfide being a condensation product of about 1 part by weight of chlorinated petrolatum containing about 5 to 50% of chlorine, with 0.5-5.0 parts by weight of sodium pentasulfide.

9. The process of preparing wax modifiers which comprises reacting together a chlorinated aliphatic organic compound containing more than 5 aliphatic carbon atoms with an inorganic polysulfide, and distilling the reaction product to about 600° F. to get a high molecular weight residue having wax-modifying properties.

10. The process of preparing wax modifiers which comprises reacting together a chlorinated aliphatic hydrocarbon wax with an inorganic polysulfide of an inorganic cation having a valence of not more than 2, and distilling the reaction product to about 600° F. to obtain a high molecular weight residue having wax-modifying properties.

11. The process of preparing wax modifiers which comprises reacting together chlorinated petrolatum and sodium pentasulfide at a temperature between the approximate limits of room temperature and about 300° F. in the presence of an inert solvent, and distilling the reaction products to about 600° F. to obtain a high molecular weight residue having wax-modifying properties.

12. The process of preparing pour depressors which comprises reacting 1 part by weight of chlorinated petrolatum containing about 5 to 50% of chlorine, with about 0.5-5.0 parts by weight of sodium pentasulfide, by refluxing said reaction in isopropyl alcohol for about 1 to 20 hours, adjusting the temperature and time to obtain a high molecular weight oil-soluble condensation product having pour-depressing properties, and distilling the resulting reaction product to about 600° F. with fire and steam distillation to obtain a high molecular weight residue having the desired pour-depressing properties.

13. A composition comprising a hydrocarbon wax and a high molecular weight condensation production of a halogenated aliphatic organic compound containing at least 5 aliphatic carbon atoms with an inorganic sulfur-containng material selected from the class consisting of inorganic polysulfides and mixtures thereof with elemental sulfur, said product having a molecular weight above about 1,000 and being substantially non-volatile at temperatures up to about 600° F.

14. A composition comprising a hydrocarbon wax and a high molecular weight condensation product of a chlorinated aliphatic organic compound having more than 5 aliphatic carbon atoms with an inorganic polysulfide, said product having a molecular weight above about 1,000 and being substantially non-volatile at temperatures up to about 600° F.

15. A composition comprising a major proportion of a hydrocarbon oil and a small amount of a wax modifier consisting essentially of a high molecular weight reaction product of a chlorinated aliphatic hydrocarbon wax with an inorganic polysulfide of an inorganic cation having a valence of not more than 2, said product having a molecular weight above about 1,000 and being substantially non-volatile at temperatures up to about 600° F.

16. A composition comprising a major proportion of a wax-containing hydrocarbon oil and a small amount of an aliphatic hydrocarbon polysulfide non-volatile at temperatures up to 600° F., having a molecular weight above about 1,000, and having pour-depressing properties.

17. A lubricating oil composition comprising a major proportion of a wax-containing hydrocarbon lubricating oil and a pour-depressing amount of a high molecular weight reaction product of 1 part by weight of chlorinated petrolatum containing about 5 to 50% of chlorine, with about 0.5-5.0 parts by weight of sodium pentasulfide, said product having a molecular weight above about 1,000 and being substantially non-volatile at temperatures up to about 600° F.

EUGENE LIEBER.
ALOYSIUS F. CASHMAN.